Feb. 16, 1954 A. PITT ET AL 2,669,637
METHOD AND APPARATUS FOR FORMING CRANKSHAFTS
Filed Aug. 31, 1950 2 Sheets-Sheet 1

Inventors
ARNOLD PITT
LORNE F. KNIGHT
By: Fetherstonhaugh & Co.
Att'ys.

Feb. 16, 1954    A. PITT ET AL    2,669,637
METHOD AND APPARATUS FOR FORMING CRANKSHAFTS
Filed Aug. 31, 1950    2 Sheets-Sheet 2
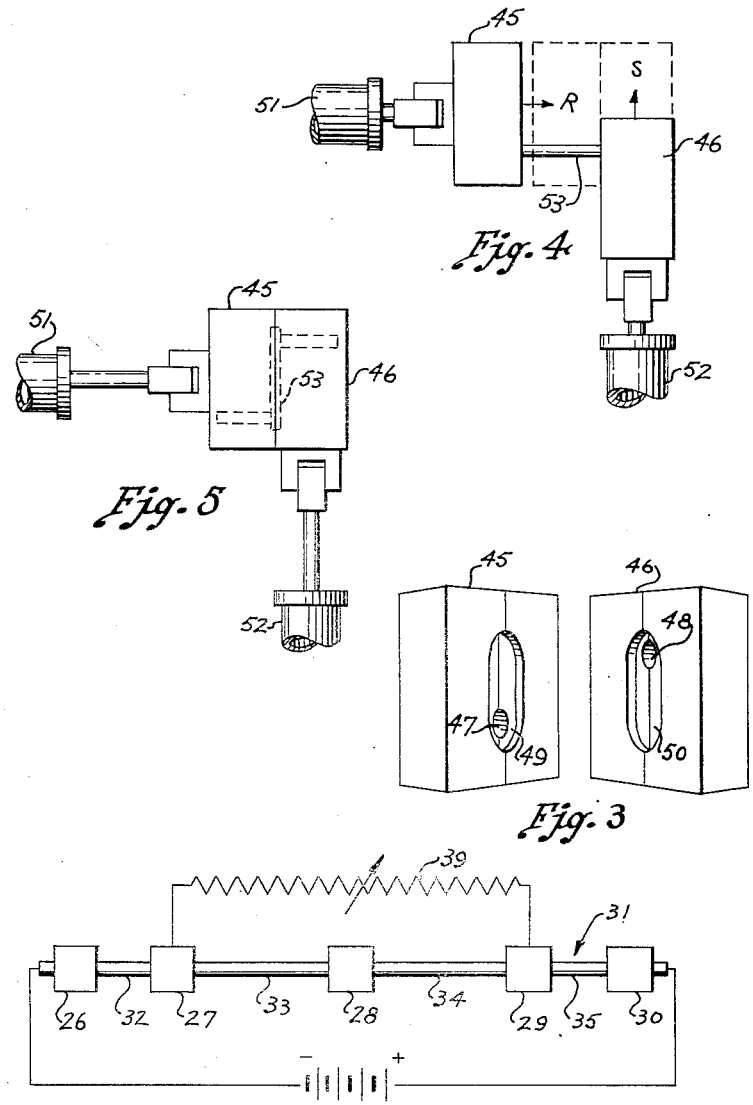
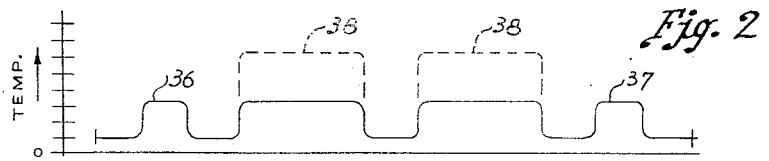
Inventors
ARNOLD PITT
LORNE F KNIGHT
By: Fetherstonhaugh & Co.
Att'ys.

Patented Feb. 16, 1954

2,669,637

UNITED STATES PATENT OFFICE 2,669,637

METHOD AND APPARATUS FOR FORMING CRANKSHAFTS

Arnold Pitt, Weston, Ontario, and Lorne F. Knight, Toronto, Ontario, Canada, assignors to Massey-Harris Company Limited, Toronto, Ontario, Canada Application August 31, 1950, Serial No. 182,438

5 Claims. (Cl. 219—3)

1

This invention relates to a method of and apparatus for forming engine crank shafts or the like. This application forms a continuation-in-part of application Serial Number 92,982, filed May 13, 1949, issued as Patent 2,555,695.

In the formation of crank shafts from bar stock or the like as disclosed in the said patent the bar may be mounted in more than two clamps and an electrical current passed therethrough from one endmost clamp to the other endmost clamp of the electrical circuit. Regions of the bar between adjacent clamps are defined as deformable regions. It has been found that the clamps of such apparatus carry away heat from immediate portions of the deformable regions. Accordingly, if a deformable region is comparatively short in relation to any other deformable region of the bar unequal heating will result as between deformable regions of different length.

According to the present invention it is necessary to take into account the "useful heat energy" per unit of volume in a deformable region, that is, that energy remaining having regard to the dissipation of a portion thereof to the clamps at either end of such region. Thus in the case where the bar stock is heated by the passage of electrical current therethrough the amount of useful heat energy per unit of volume in any deformable region is controlled by dissipating a portion of the electrical energy flowing through such region such as by utilizing an electrical shunting device.

Another object of the invention is to provide a die-head formed in adjacent clamps whereby the deformable region of bar stock therebetween may be formed to predetermined contours.

Other objects of the invention will be appreciated by a study of the following specification taken in conjunction with the accompanying drawings.

In the drawings:

Figure 2 is a diagrammatic illustration of the heat shunting method according to the invention illustrating in the lower portion the temperature gradient along the bar stock during heating.

Figure 3 is a perspective view of a pair of cooperating clamping heads and die means incorporated therein according to the invention.

Figure 4 is an elevation of clamps of the type illustrated in Figure 3 in a position where the bar stock is in axial alignment.

Figure 5 shows the developed movement of the clamps of Figure 4 in deforming the bar stock.

2

Figure 1:
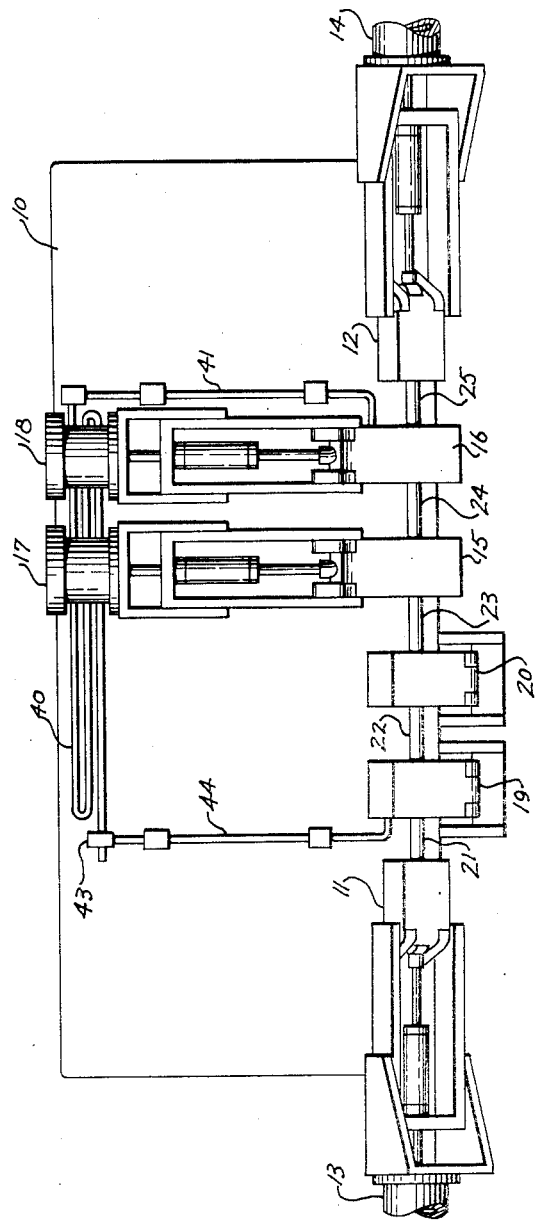
Figure 1 is a plan view of apparatus for forming crank shafts of the form disclosed in our prior patent referred to above.

Referring in more detail to the drawings, and particularly to Figure 1, the apparatus of the invention may comprise a base frame 10 carrying axially aligned end clamping means 11 and 12 movable toward and away from one another by means of hydraulic rams 13 and 14. Tranversely-acting clamps 15 and 16 are actuated by hydraulic ram devices 17 and 18. The oppositely transversely moving clamps 19 and 20 are likewise actuated by suitable hydraulic rams (not shown). The apparatus is in accordance with the disclosure of the prior application referred to, and wherein the clamps are separated by the deformable regions 21, 22, 23, 24 and 25.

All of the clamps are insulated from the frame and from one another and electrical energy is introduced to the bar stock from the circuit end clamps 11 through the stock to the circuit end clamp 12. The clamped regions are not heated effectively by the passage of electrical current therethrough by reason of their action as an electrical conductor having regard to their large sectional area. Moreover, the clamps may be cooled by cooling water as disclosed in said previous application and as a result, the clamps draw a certain amount of heat from the heated deformable regions of the bar stock where the deformable regions 22, 23 and 24 are of substantially equal length as illustrated, all of these regions will be heated at the same rate if their clamps are of the same heat dissipating character. On the other hand, the end regions 21 and 25, being of shorter length, will lose a proportionately greater amount of their total heat energy to the adjacent clamps.

Thus, in Figure 2, the clamps 26, 27, 28, 29 and 30 support the bar stock 31 defining deformable regions 32, 33, 34 and 35, in which the regions 32 and 35 are of shorter length than the other two. Without any compensation for heat loss to the clamps the temperature attained due to useful heat energy after a predetermined period of time is represented by the curves 36 and 37 for the regions 32 and 35 for each of the deformable regions. However, in the same period of time the longer deformable regions 33 and 34 will have attained a much higher temperature corresponding to a higher value of useful heat energy per unit volume as illustrated by the curve 38 shown in dotted lines.

According to the invention, an electrical circuit expedient is preferred for balancing the useful heat energy per unit volume in the various deformable regions to desired values. Thus, an adjustable resistance device in the form of a variable resistor 39 may extend between the clamps 27 and 29 if the clamp 28 is disposed intermediately thereof. Thus, referring to Figure 1, the deformable regions 22, 23 and 24 in the case illustrated are all of the same length. Moreover, the deformable regions 21 and 25 are of equal length but shorter than the other deformable regions. Accordingly, a nickel-chrome rod 40 is supported upon the frame 10 and insulated therefrom, and a suitable electrical conductor 41 extends from one end thereof to the clamps 16. A slidable collar 43 makes electrical connection to the other end of the nickel-chrome rod 40 and is slidable therealong for adjustment purposes. A suitable conductor 44 extends from the collar 43 to the clamp 19.

In the interests of simplicity, special cases have been discussed in the illustration of the invention. It will be appreciated that the invention is applicable to the general case of a rod having more than two deformable regions of unequal length and wherein the useful heat energy per unit volume in one of the regions only may be controlled according to the invention for a special purpose, in which case the controlled region may have a temperature greater than that derived from the useful heat energy per unit volume of a shorter deformable region. Moreover, it is not intended that the method of the invention be restricted to the elementary electrical circuit arrangement illustrated in Figure 2, for it is possible to use a three phase system. Thus it will be appreciated that the shunting of a portion of the electrical energy causing the heating of a deformable region has a twofold purpose of correcting the heating of such region to the desired temperature, as well as compensating for the heat dissipating effect at the ends of such region relative to similar effects in other deformable regions of the bar stock.

In the apparatus of Figure 1 as described in the said application Serial Number 92,932, the intermediate clamps 15, 16, 19 and 20 have two directions of movement, laterally and also in the direction of the axis of the bar stock. Although the specifications for many forms of crank shaft may permit a resulting crank arm of a form similar to the form of the original bar stock and thus rod-like in character, it is contemplated herein to provide means in conjunction with adjacent clamps whereby such crank arms may be formed in predetermined manner and to predetermined contour simultaneously with the formation of the crank shaft itself. Thus, in Figure 3 a pair of adjacent clamps 45 and 46 have bar stock accommodating bushings 47 and 48 therein which terminate in co-operating die faces 49 and 50. A simple illustration of the method is shown in Figures 4 and 5 wherein the clamps 45 and 46 under the action of suitable rams 51 and 52 move in the direction of arrows R and S respectively after the formable region 53 of the bar stock clamped thereby has been heated to a deforming temperature. The clamps 45 and 46 finally arrive at the engaged positions illustrated in Figure 5 wherein the die faces 49 and 50 thereof co-operate to spread the deformable region of the bar stock to a predetermined contour. For clarity, the simplest illustration has been discussed. Nevertheless, it will be appreciated by skilled persons that the die faces may be formed to assist in distribution of material for balancing purposes.

Where only one pair of a series of clamps of a single length of bar stock incorporate die faces, it will be appreciated that the deformable region between such die faces will require heating to a different temperature than that required for a simple bending operation to be carried out in the other deformable regions. It is thus not mandatory according to the invention to equalize the heating of all the deformable regions to a value corresponding to that deformable region having the lowest amount of useful heat energy per unit volume.

What we claim as our invention is:

1. The method of simultaneously heating a plurality of deformable regions of a metal rod or bar at the same heating rate, comprising the steps in combination of: clamping the rod at points between and beyond the selected deformable regions thereof, passing an electrical current through the rod from one endmost clamped point to the other endmost clamped point, to cause the deformable regions thereof to be heated; and reducing the heating rate of certain of said deformable regions to equalize the heating rate of all of the deformable regions at a value corresponding to that of the deformable region having the slowest rate of heating, by electrically shunting said certain deformable regions.

2. The method of forming an engine crankshaft or the like from a length of rod or bar stock, comprising: clamping the bar stock at spaced apart regions along its length; causing an electrical current to flow through the bar stock from one endmost clamped region to the other endmost clamped region to provide simultaneous heating of the bar stock in deformable regions thereof between the clamped regions thereof; electrically shunting certain of said deformable regions to reduce the heating rate thereof and to equalize the heating rate of all of said deformable regions; and deforming said deformable regions after they have attained a deforming temperature.

3. The method of forming an engine crankshaft or the like from a length of rod or bar stock, comprising: clamping the bar stock at spaced apart regions along its length; causing an electrical current to flow through the bar stock from one endmost clamped region to the other endmost region to provide simultaneous heating of the bar stock in deformable regions thereof between the clamped regions thereof; electrically shunting certain of said deformable regions to reduce the heating rate thereof and to equalize the heating rate of all of said deformable regions; and simultaneously deforming said deformable regions after they have attained a deforming temperature.

4. Apparatus for bending a length of rod, bar stock or the like, comprising, in combination: a machine bed; at least three clamps; means for mounting said clamps on said bed to receive said bar stock; means mounting one of said clamps including guide means allowing movement of said clamp in a direction transversely of the axis of said bar stock; electrical conductors forming a part of said clamping means and having surfaces for making electrical contact to surfaces of the bar stock clamped thereby; insulating means isolating said clamps electrically; means for causing an electrical current to flow between said clamps through the bar stock held thereby; electrical shunting means connecting between certain of said clamps to reduce the heating rate of all of the heated portions of said bar stock between said clamps to the same value; and means for moving said guided clamp in a direction determined by the guide means thereof after simultaneous heating of said bar stock to a uniform deforming temperature controlled by said shunting means.

5. Apparatus for bending a length of rod, bar stock or the like comprising, in combination: a machine body; at least three clamps slidably mounted on said body; means providing slidable movement of certain of said clamps in the axial direction of bar stock held thereby; means guiding the movement of certain of said clamps in a direction transversely of the axis of the bar stock clamped thereby; a hydraulic ram disposed between the machine body and each transversely movable clamp for causing transverse movement thereof; means for supplying an electrical current to the clamps engaging the endmost regions of the bar stock to cause simultaneous heating of the latter in deformable regions thereof defined by the unclamped regions of the bar stock between said clamps; electrical shunting means connected between certain of said clamps to reduce the heating rates of all of said deformable regions to the same value; and means for actuating said hydraulic ram when the deformable regions of the bar stock have reached a deforming temperature.

ARNOLD PITT.
LORNE F. KNIGHT.

References Cited in the file of this patent

UNITED STATES PATENTS

| Number | Name | Date |
|---|---|---|
| 624,019 | Harrington | May 2, 1899 |
| 1,181,703 | Warner | May 2, 1916 |
| 1,752,598 | Jorgensen | Apr. 1, 1930 |
| 2,175,156 | Mummert | Oct. 3, 1939 |
| 2,473,245 | Hanna | June 14, 1949 |

FOREIGN PATENTS

| Number | Country | Date |
|---|---|---|
| 385,391 | Germany | Nov. 23, 1923 |